(12) United States Patent
Ito

(10) Patent No.: US 8,472,065 B2
(45) Date of Patent: *Jun. 25, 2013

(54) IMAGE PROCESSING APPARATUS, IMAGE PROCESSING METHOD AND COMPUTER READABLE MEDIUM

(75) Inventor: Morikazu Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,212

(22) Filed: Jul. 10, 2012

(65) Prior Publication Data

US 2012/0287474 A1    Nov. 15, 2012

Related U.S. Application Data

(62) Division of application No. 12/433,150, filed on Apr. 30, 2009, now Pat. No. 8,237,967.

(30) Foreign Application Priority Data

May 9, 2008 (JP) ................................ 2008-123559

(51) Int. Cl.
*G06F 3/12* (2006.01)
(52) U.S. Cl.
USPC ......... 358/1.15; 358/450; 358/1.16; 358/1.12
(58) Field of Classification Search
USPC ......... 358/1.15, 1.16, 1.12, 450, 501, 426.07, 358/426.04, 426.13, 448
See application file for complete search history.

(56) References Cited

U.S. PATENT DOCUMENTS

| | | | |
|---|---|---|---|
| 3,672,297 A | | 6/1972 | Berglund et al. |
| 5,748,763 A | * | 5/1998 | Rhoads ........................ 382/115 |
| 5,930,466 A | | 7/1999 | Rademacher |
| 6,750,978 B1 | * | 6/2004 | Marggraff et al. .......... 358/1.12 |
| 6,879,701 B1 | * | 4/2005 | Rhoads ......................... 382/100 |
| 7,027,178 B2 | * | 4/2006 | Satomi et al. ............... 358/1.15 |
| 7,055,927 B2 | * | 6/2006 | Silverbrook .................. 347/19 |
| 7,061,638 B2 | * | 6/2006 | Yamada ....................... 358/1.15 |
| 7,452,048 B2 | * | 11/2008 | Silverbrook .................. 347/16 |
| 7,490,779 B2 | * | 2/2009 | Shinozaki ............... 235/472.03 |
| 7,493,558 B2 | * | 2/2009 | Leahy et al. ................ 715/704 |
| 7,527,209 B2 | * | 5/2009 | Silverbrook ................ 235/494 |
| 7,593,542 B2 | * | 9/2009 | Abe et al. ..................... 382/100 |
| 7,652,796 B2 | * | 1/2010 | Shiina ......................... 358/3.28 |
| 7,659,532 B2 | * | 2/2010 | Kikuchi ....................... 250/566 |
| 7,898,697 B2 | * | 3/2011 | Tanaka ........................ 358/3.28 |
| 8,068,679 B2 | * | 11/2011 | Rhoads ........................ 382/227 |

(Continued)

FOREIGN PATENT DOCUMENTS

JP    10-143414    5/1998
JP    2007-81936   3/2007

*Primary Examiner* — Negussie Worku
(74) *Attorney, Agent, or Firm* — Fitzpatrick, Cella, Harper & Scinto

(57) ABSTRACT

An image processing apparatus is provided which determines a printing position of an identification code in accordance with a print setting designated for printing target data. For example, it makes a decision as to which one of the cutting printing, poster printing, job-based printing (such as bookbinding printing or staple printing), 2-sided printing, and other printing (such as normal layout printing and reduction layout (Nup) printing) is designated, and decides the printing position of a two-dimensional code. In page layout printing, the two-dimensional code is output in a mode suitable for source document data after page layout.

11 Claims, 17 Drawing Sheets

U.S. PATENT DOCUMENTS

| | | | | |
|---|---|---|---|---|
| 8,190,713 B2 * | 5/2012 | Rhoads | ........................ | 709/219 |
| 8,237,954 B2 * | 8/2012 | Kubo | ........................ | 358/1.15 |
| 8,237,967 B2 * | 8/2012 | Ito | .............................. | 358/1.15 |
| 2001/0029513 A1 | 10/2001 | Kuwano et al. | | |
| 2007/0057060 A1 | 3/2007 | Hasuike | | |
| 2007/0242305 A1 | 10/2007 | Onishi | | |

* cited by examiner

TWO-DIMENSIONAL CODE REDUCED AND PLACED ON MULTIPLE PAGES

IMAGE PROCESSING APPARATUS, IMAGE PROCESSING METHOD AND COMPUTER READABLE MEDIUM

This application is a divisional of U.S. patent application Ser. No. 12/433,150, filed Apr. 30, 2009, and allowed on Apr. 12, 2012.

BACKGROUND OF THE INVENTION

1. Field of the Invention

The present invention relates to a technology for carrying out high quality printing using an original document.

2. Description of Related Art

There is a system that stores scan data read from a source document by a scanner in a storage device as document data, and that when copying the source document afterward, reads the document data corresponding to the source document from the storage device and prints. The system utilizes, when copying the source document using an image processing system such as an MFP (MultiFunction Peripheral), the document data corresponding to the source document as the data for printing rather than the scan data of the source document. As an example of such a system, there is a technology disclosed in Japanese Patent Laid-Open No. H10-143414 (1998). The technology disclosed in it is as follows.

First, when printing a source document (original), a two-dimensional code representing document management information of the document data is printed together with the document data. After that, when making a copy of the paper document on which the data is printed, the document data corresponding to the source document is retrieved and printed in accordance with the two-dimensional code detected from the paper document. Here, the term "document management information" refers to information for designating a storage location (storage device, storage area or the like) of the document data.

On the other hand, there is page layout printing that prints source document data on a plurality of continuous pages on a sheet of paper with a reduction arrangement (also referred to as "reduction layout", "aggregation" or "combination"). The page layout printing is a function effective for draft printing, catalog printing and the like.

In addition, Japanese Patent Laid-Open No. 2007-81936 describes a technique of printing data about print conditions such as paper size, direction of printing and aggregation conditions and about a document form in a two-dimensional code. Then, it discloses a technique of deciding the layout of a page using the two-dimensional code printed on paper when making a copy. In particular, it discloses a technique of prohibiting, when a scanned source document has already been 2-in-1 printed when making a copy, further aggregation of the source document image, or a technique of carrying out control for adjusting the direction of the images.

However, the foregoing conventional technology does not decide the printing position of the two-dimensional code taking account of the way the printed matter is utilized after printout.

When printing a document having a two-dimensional code assigned to each page in the reduction layout (2-in-1, 4-in-1 and the like), printed matter with a page layout as shown in FIG. 1 is obtained. As shown FIG. 1, since the pages each having the two-dimensional code are reduced and printed, the single page includes a plurality of reduced two-dimensional codes, thereby deteriorating the appearance of the printed matter. In addition, since the two-dimensional codes are reduced to be printed in this case, it becomes difficult to read the two-dimensional codes. Besides, since a plurality of two-dimensional codes must be processed, the performance of the printing processing is reduced.

Therefore an object of the present invention is to provide an image processing apparatus capable of outputting a two-dimensional code in a mode suitable for the source document data.

SUMMARY OF THE INVENTION

An image processing apparatus in accordance with the present invention comprises a position deciding component configured to decide a printing position of an identification code according to a print setting designated for printing target data; an identification code generating component configured to generate the identification code including information about the printing target data; a combining component configured to combine bitmap data for the generated identification code into a printing position in bitmap data generated from the printing target data, wherein the printing position is decided by the position deciding component; and an output component configured to output combined bitmap data.

Another image processing apparatus in accordance with the present invention comprises a component configured to input a page description language, page layout information, and identification code output position information indicating an output position of an identification code; a component configured to convert the page description language into an intermediate page description language based upon the page layout information; a component configured to generate page layout information metadata associated with the intermediate page description language based upon the page layout information and the identification code output position information; a component configured to generate an identification code designating a link information, wherein the link information indicates the page layout information metadata; a component configured to convert the intermediate page description language and the identification code into bitmap data; a component configured to combine the bitmap data of the intermediate page description language with the bitmap data of the identification code; and a component configured to store the intermediate page description language and the page layout information metadata associated with each other in a storage.

An image processing method in accordance with the present invention comprises a step of inputting a page description language, page layout information, and identification code output position information indicating an output position of an identification code; a step of converting the page description language into an intermediate page description language based upon the page layout information; a step of generating page layout information metadata associated with the intermediate page description language based upon the page layout information and the identification code output position information; generating an identification code designating a link information, wherein the link information indicates the page layout information metadata; a step of converting the intermediate page description language and the identification code into bitmap data; a step of combining the bitmap data of the intermediate page description language with the bitmap data of the identification code; and a step of storing the intermediate page description language and the page layout information metadata associated with each other in a storage.

A computer readable medium in accordance with the present invention records a program for causing a computer to execute the foregoing image processing method.

According to the present invention, it can facilitate calling the page layout information by placing the link information to the page layout information metadata, which manages the information about the plurality of pages having been subjected to the page layout, in the identification code such as a two-dimensional code. In addition, according to the present invention, since it sets the number of the two-dimensional codes to be printed at an appropriate number (such as one) in accordance with the page layout, it can offer the following advantages.

It can reduce analyzing time of the two-dimensional code or the like.

It can fix the size and printing position of the two-dimensional code or the like, thereby being able to increase a success rate when reading the two-dimensional code or the like.

It can provide a user with a good appearance printed matter.

Further features of the present invention will become apparent from the following description of exemplary embodiments (with reference to the attached drawings).

BRIEF DESCRIPTION OF THE DRAWINGS

The best mode for carrying out the invention will now be described with reference to the accompanying drawings.

DESCRIPTION OF THE EMBODIMENTS (Structural Example of MFP)

Figure 1:
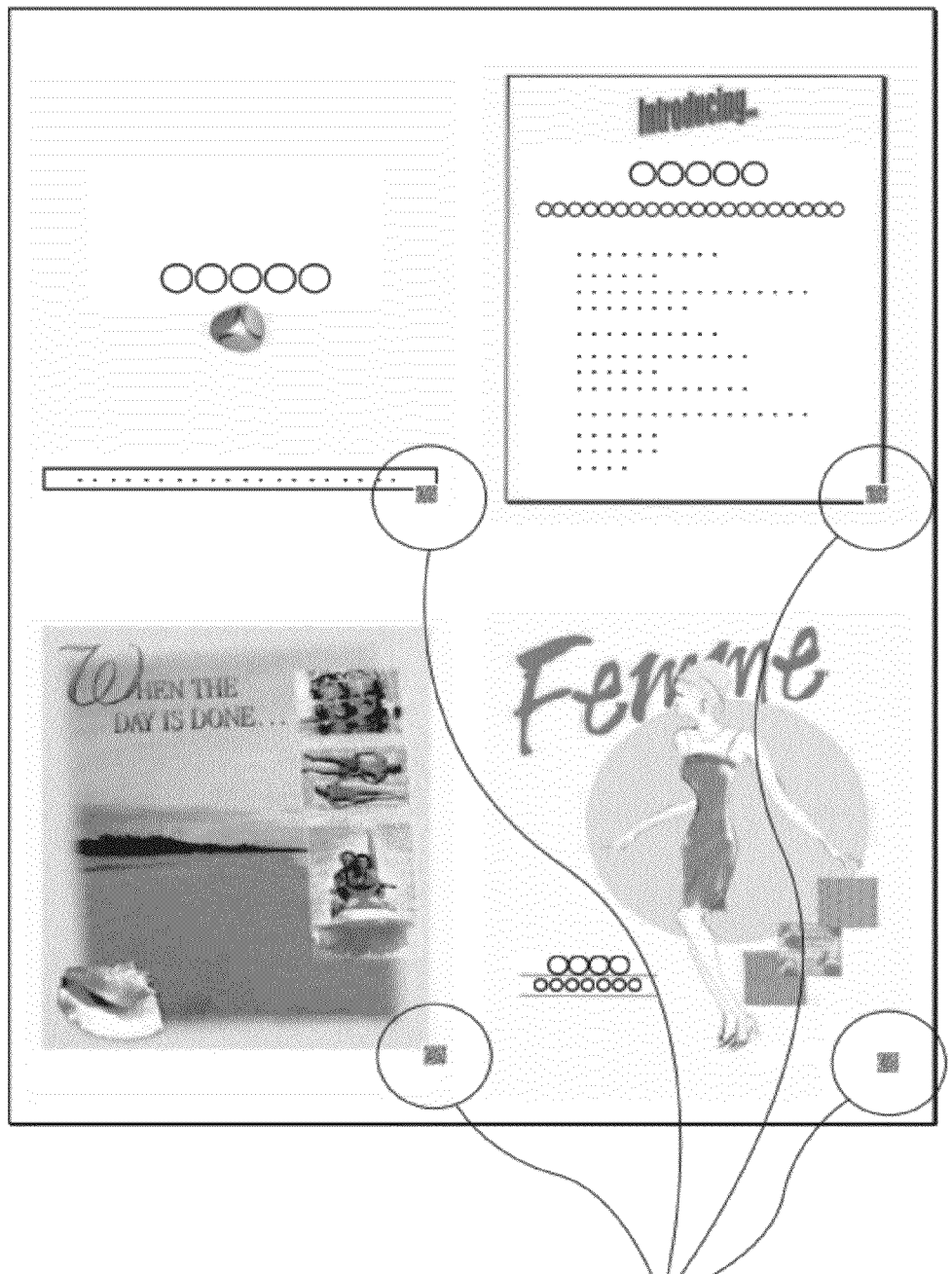
FIG. 1 is a view showing a conventional two-dimensional code output example.
Figure 2:
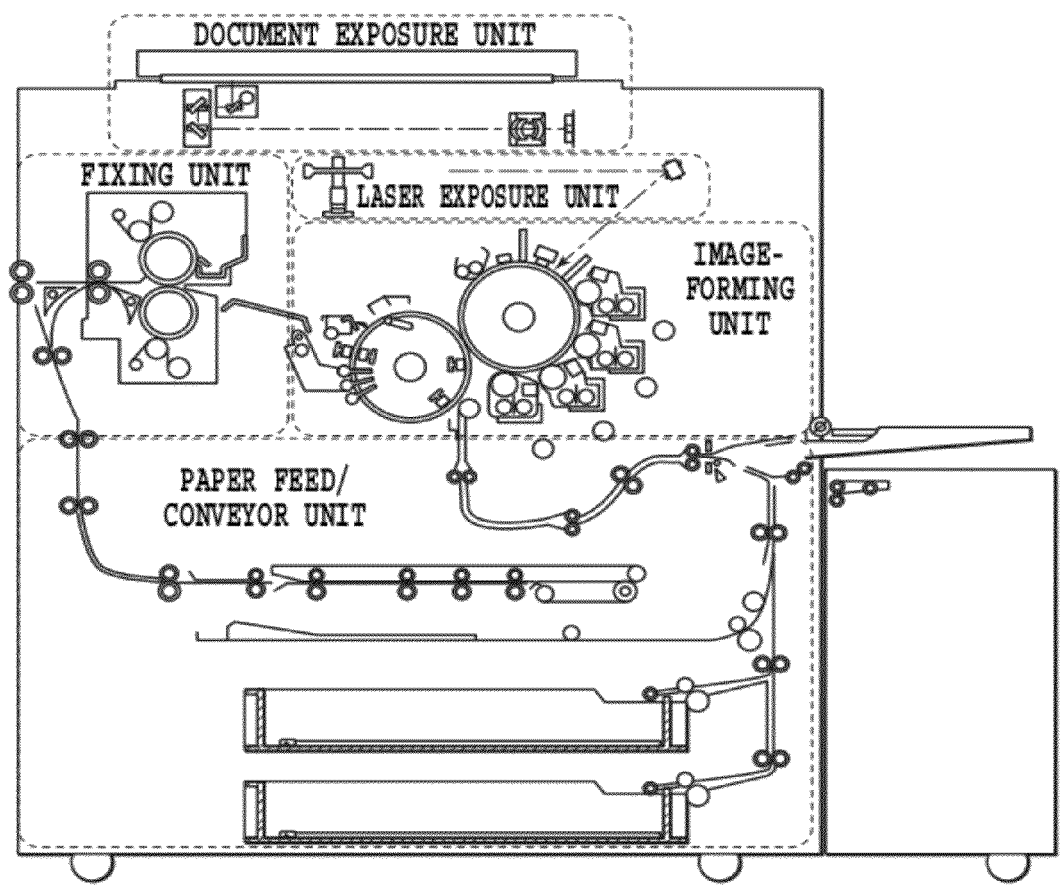
FIG. 2 is a diagram showing a construction of an MFP suitable for implementing the present invention.

FIG. 2 is a diagram showing a construction of an MFP suitable for implementing the present invention.

A document exposure unit (scanner unit) reads a source document placed on document glass optically, and generates image data.

A laser exposure unit launches laser light modulated by the image data onto a rotary polygon mirror rotating at uniform angular velocity, and irradiates a photoconductive drum with the reflected light serving as scanning light to form a latent image on the photoconductive drum.

An image-forming unit executes an electrophotographic process. The electrophotographic process has a series of processes such as rotary driving of the photoconductive drum, charging by a charger, development of a latent image by toners, transfer of toner images onto a sheet, and collection of a minute quantity of toners left on the photoconductive drum. The development of the latent image by toners is carried out by a developing unit having toners of magenta (M), cyan (C), yellow (Y) and black (K) while a sheet is rotated four times winding itself around a prescribed position of a transfer belt. By the developing process, toner images of YMCK colors are formed on the photoconductive drum. Subsequently, the full-color toner image of the four colors formed on the photoconductive drum is transferred onto the sheet by transfer process. The sheet having the toner images transferred is conveyed to a fixing unit.

The fixing unit has rollers, a belt and a heat source such as a halogen heater, and fixes the toners on the sheet by melting the toners on the sheet with heat and pressure.

A paper feed/conveyor unit has at least one sheet container such as a sheet cassette or paper deck. The paper feed/conveyor unit separates a sheet from a plurality of sheets stored in the sheet container in accordance with an instruction from a control unit (not shown) of the image processing system, and carries it to the image-forming unit and fixing unit. The sheet is conveyed to the fixing unit after being wound around the prescribed position of the transfer belt of the image-forming unit and rotated four times. During the four revolutions of the sheet, the toner images of the YMCK colors are transferred onto the sheet. When images are formed on both sides of the sheet, the sheet passing through the fixing unit is carried back to the image-forming unit again via a conveyor path.

The control unit controls the operation of the scanner, laser exposure unit, image-forming unit, fixing unit, paper feed/conveyor unit and the like.

(Configuration Example of System)

Figure 3:
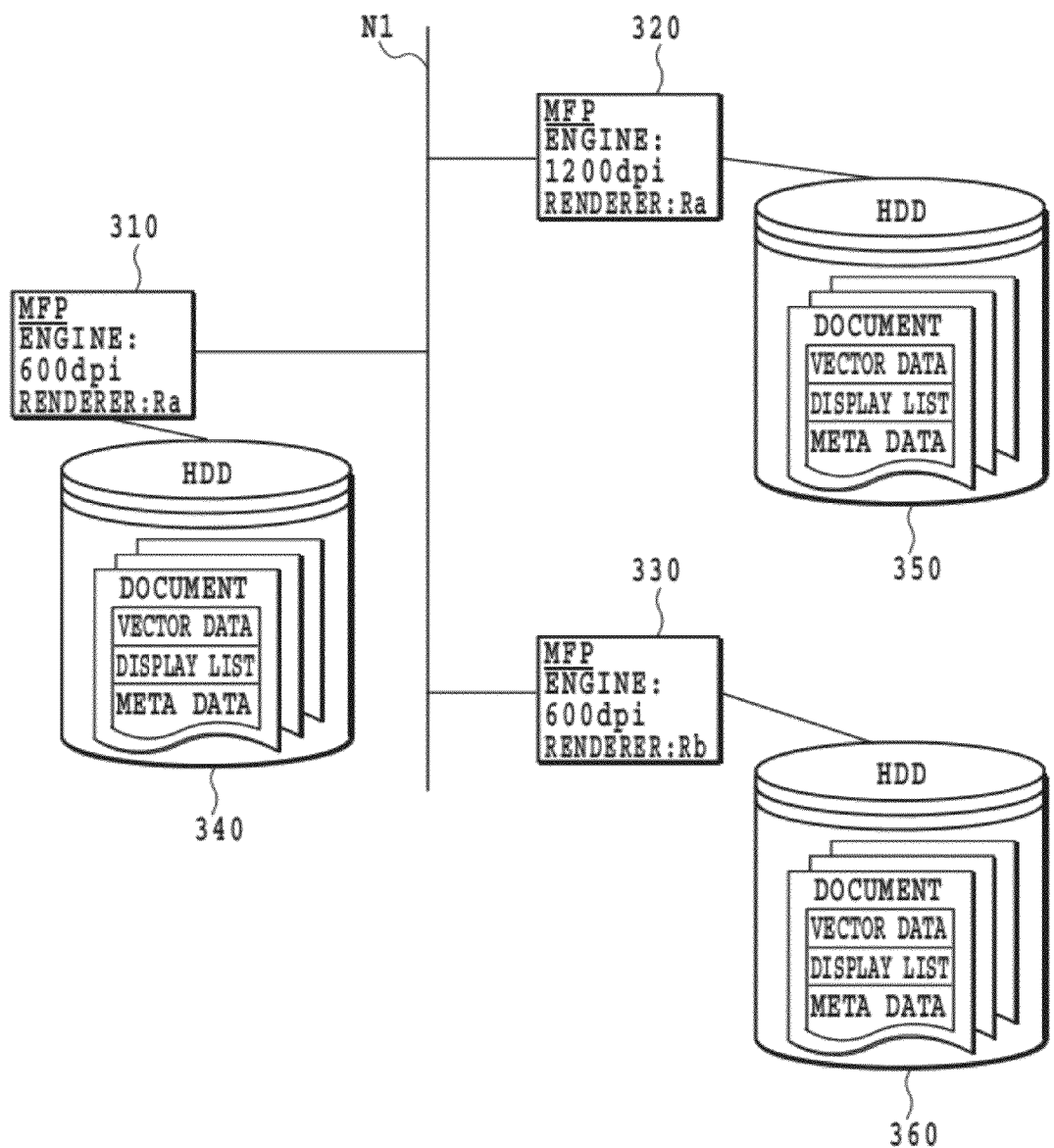
FIG. 3 is a block diagram showing a configuration of an image processing apparatus in accordance with the present invention.

FIG. 3 is a block diagram showing a configuration of an image processing system in accordance with the present invention.

In FIG. 3, the image processing system has a communication network such as a LAN (Local Area Network) (N1), and MFP 310, MFP 320 and MFP 330 capable of communicating via the communication network. The MFPs carry out data communication with each other via the LAN.

The MFPs have HDDs (Hard Disk Drives) 340, 350 and 360 as a storage device, respectively.

Resolutions of the MFPs differ depending on the type of the MFPs. The term "resolution" refers to a value indicating a definition level of the printing of a printer or the like. As for the printer, the resolution is represented in terms of the number of dots printable per inch (the unit is dpi). The greater the resolution, the higher the definition of characters and images reproduced. As for the scanner, also, the performance of how precisely it can read an image is defined in terms of a resolution represented in dpi. It is assumed here that the resolution of the printers of the MFP 310 and MFP 330 is 600 dpi, and the resolution of the printer of the MFP 320 is 1200 dpi. The resolutions of the scanners mounted on the MFPs also differ for each MFP. It is assumed here that the resolution of the scanners of the MFP 310 and MFP 320 is 600 dpi, and the resolution of the scanner of the MFP 330 is 300 dpi. The processing performance of the printer differs for each MFP. It is assumed that the MFP 310 and MFP 320 are equipment capable of color (Full Color) printing, and the MFP 320 is equipment capable of monochromatic (Mono Color) printing.

In addition, each MFP has a rasterizer mounted. The rasterizer is hardware or software tool for expressing characters or images a computer handles in an arrangement of small color dots (bitmap data) so that a printer can print them. The computer stores in itself a font (characters) or printing image in the form of coordinates of points and parameters of equations of lines and planes connecting the points, and rendering information such as solid filling in the vector form. On the other hand, the printer cannot print the rendering information (vector data) in the vector form as it is because it handles the image as a set of color dots (pixels) arranged in horizontal and vertical directions. Accordingly, it is necessary to convert the vector form rendering information to raster form bitmap data. The conversion of the vector data to the bitmap data is referred to as rasterization.

When printing using the MFP with a function of collectively printing data of one page, the computer generates PDL data (Page Description Language data) and transmits the PDL data it generates to the MFP via a network. The MFP converts the PDL data to the vector data, and further converts the vector data to a display list (DL). The term "PDL data" means a Page Description Language for designating a layout of characters and graphics on a "page" to be printed. The term "display list" refers to an intermediate page description language generated in the process of converting the vector data to bitmap data. The display list describes rendering instructions. The rasterizer described before converts the display list to bitmap data.

Incidentally, as for the functions of the MFP 310-MFP 330 and the number of the MFPs, they are not limited to those shown in FIG. 3. In addition, to the LAN 10, any information processing system other than the MFP such as a computer can be connected.

(Configuration Example of Controller)

Figure 4:
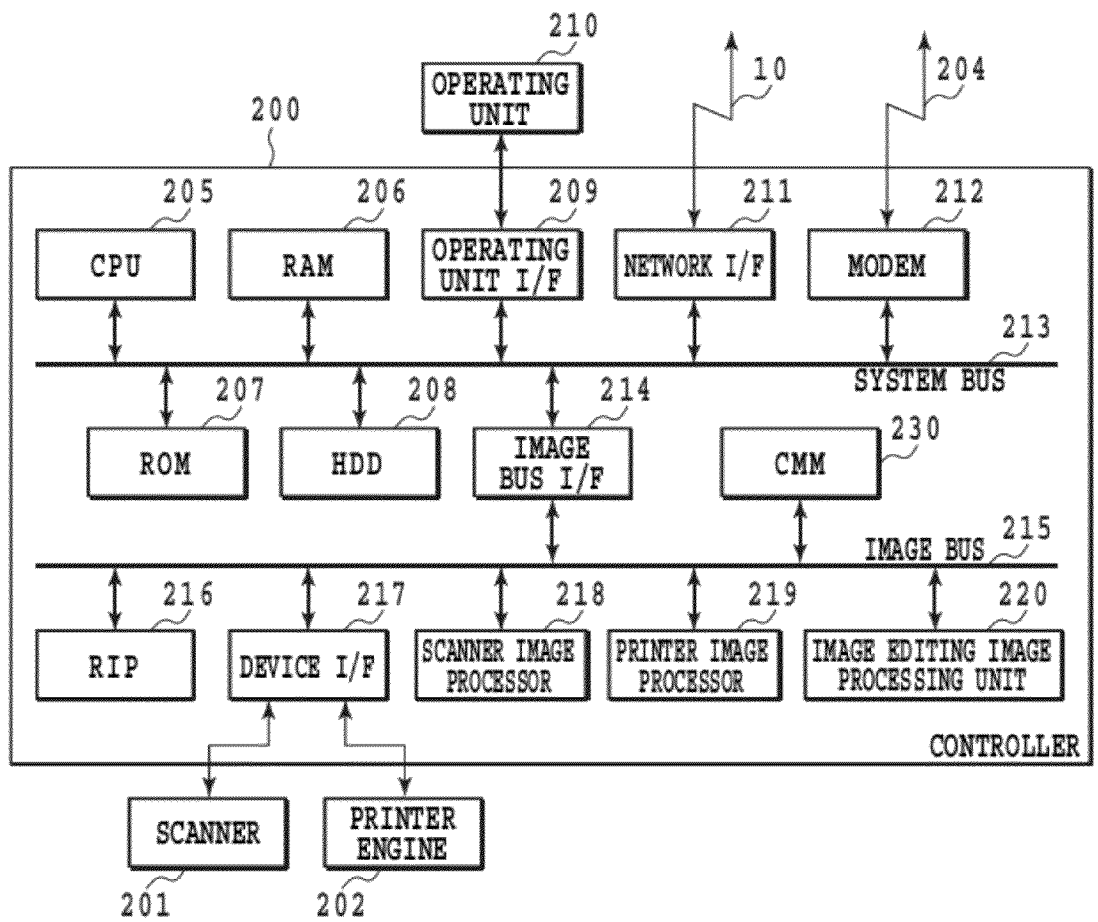
FIG. 4 is a block diagram showing a configuration of the controller of the MFP suitable for implementing the present invention.

FIG. 4 is a block diagram showing a configuration of the controller of the MFP suitable for implementing the present invention.

The controller 200 is connected to a scanner 201, a printer engine 202 and an operating unit 210, and carries out, using its internal CPU, reading control of image data, image processing, printout control, print settings and the like. In addition, the controller 200 performs input/output control of the image information and device information between it and external devices (such as the other MFPs or information processing systems like a computer).

The controller 200 has a system bus 213 and an image bus 215 for transferring image data at high speed, and various components are connected to the buses. The system bus 213 and the image bus 215 are interconnected via an image bus I/F 214. The image bus I/F 214 is an interface for connecting the system bus 213 and the image bus 215.

To the system bus 213, a CPU 205, a RAM 206, a ROM 207, an HDD 208, an operating unit I/F 209, a network I/F 211, and a modem 212 are connected.

The CPU 205 operates on the basis of controller software, which will be described later. The RAM 206 serves as a system work memory the CPU 205 uses, and also as an image memory for temporarily storing input image data. The ROM 207 is a boot ROM that stores a boot program of the system. The HDD 208, which is a hard disk drive, stores controller software for various processing and input image data and the like.

The operating unit I/F 209 outputs operating screen data to the operating unit 210 for presenting an operating screen to a user. Besides, the operating unit I/F 209 supplies to the CPU 205 an instruction the user inputs to the operating unit 210. The network I/F 211 is a LAN card or the like for connecting the controller 200 to the LAN 10, and performs data transmission and reception between it and the external devices. The modem 212 is a device for connecting the controller 200 to a public network 204, and performs data transmission and reception between it and the external devices.

To the image bus 215, a raster image processor (RIP) 216, a device I/F 217, a scanner image processor 218, a printer image processor 219, an image editing image processing unit 220, and a color management module (CMM) 230 are connected.

The raster image processor 216 converts the PDL data and vector data to bitmap data. The device I/F 217 connects the scanner 201 or printer engine 202 to the controller 200, and carries out synchronous/asynchronous conversion of the image data.

The scanner image processor 218 performs various processing such as correction, working and editing on the image data input from the scanner 201. The printer image processor 219 performs processing such as correction and resolution conversion on the image data to be printed out in conformity with the printer engine 202. The image editing image processing unit 220 carries out various image processing such as rotation of the image data and compression and decompression processing of the image data. The color management module 230 performs, on the image data, color conversion processing (or color space conversion processing) based on profile or calibration data. The profile is a function for converting, for example, color image data expressed in a color space depending on the system to that in a color space (such as Lab) independent of the system. The calibration data is data for correcting color reproduction characteristics of the scanner 201 or printer engine 202.

(Configuration Example of Controller Software)

Figure 5:
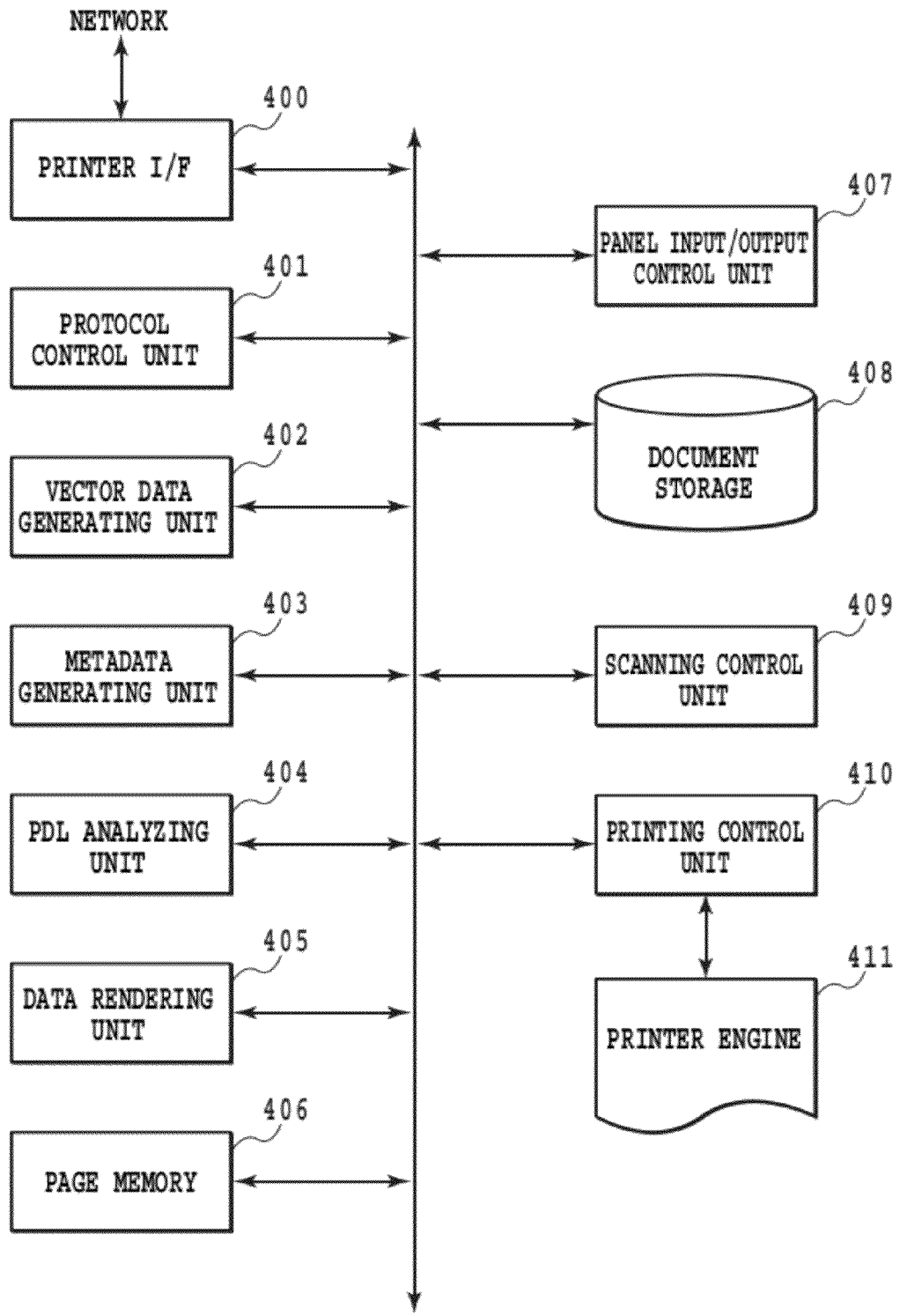
FIG. 5 is a block diagram showing a configuration of controller software for controlling the operation of the MFP.

FIG. 5 is a block diagram showing a configuration of the controller software for controlling the operation of the MFP.

A printer interface 400 carries out transmission and reception of data between it and the external devices via the network. A protocol control unit 401 performs control of data communication in accordance with a prescribed network protocol.

A vector data generating unit 402 executes processing (vectorizing) for converting the bitmap data to vector data which is a rendering description independent of the resolution. A metadata generating unit 403 generates secondary information obtained in the vectorizing process as metadata. The metadata is additional data for image retrieval.

A PDL analyzing unit 404 analyzes PDL data and converts it to a display list. A data rendering unit 405 converts the display list it receives from the PDL analyzing unit 404 to the bitmap data. A page memory 406 stores the bitmap data. A panel input/output control unit 407 controls the operating unit 210.

A document storage 408 stores the vector data, display list, and data file including the metadata on a job-by-job basis. In the following description, the data file is referred to as "document file" (Document).

A scanning control unit 409 performs various processing such as correction, working and editing on the image data input from the scanner 201. A printing control unit 410 converts the bitmap data stored in the page memory 406 to an image signal, and outputs it to a printer engine 411. The printer engine 411 generates an image to be printed on paper on the basis of the image signal received.

<<First Embodiment>>

(Document File Generating Processing and Document Printing) Processing

The generating processing of the document file in the PDL print will be described with reference to the drawings.

The term "PDL print" refers to the operation in which the MFP receives via the network the printing target data (PDL data) the printer driver installed in the computer generates, and prints it out after executing prescribed image processing.

Although the following embodiments employ a two-dimensional code as an identification code, they can also use an identification code such as a bar code or a copy-forgery-inhibited pattern.

The MFP receives the PDL data, that is, the printing target data, along with the page layout information (including the print setting) from the computer. It is assumed here that two-dimensional code output position information (identification code output position information) which will be described later is determined in accordance with the print setting (page layout) designated by a user. Although it is assume in the present embodiment that the MFP executes the two-dimensional code output position deciding processing, the computer can also execute it.

The page layout information is information that designates, when reducing and integrating a plurality of continuous pages (logical pages) into a sheet of paper (physical page), the way the plurality of logical pages are arranged into the single physical page. The page layout information includes, for example, arrangement information about logical pages such as printing the first page of the logical pages on the left side of the physical page, and the second page of the logical pages on the right side thereof.

The two-dimensional code output position information indicates a part on the paper where the two-dimensional code is to be printed in accordance with various printing mode (such as cutting printing, poster printing, job printing, and 2-sided printing).

Here, an example of the output position information on the two-dimensional code will be described.

Since the two-dimensional code is a code read by the scanner, it must have a certain size to increase its reading accuracy. On the other hand, since the two-dimensional code is placed on the source document, it is visually desirable for the user that a minimum number of the two-dimensional codes are printed on a designated region within the source document. Accordingly, it is preferable that the two-dimensional code be output as follows.

Output the two-dimensional code onto such a region where it does not conceal the original source document data (at the lower right blank space on the page, for example).

Minimize the number of the two-dimensional codes to be output (one two-dimensional code per page, for example).

Output the minimum size two-dimensional code the scanner can read.

Basically, although it is preferable that a single two-dimensional code be output per page, the output position of the two-dimensional code is conceivable which is decided in accordance with the page layout information and a method of dealing with the plurality of pages. It is assumed in the present embodiment that the output position of the two-dimensional code is decided in accordance with the print setting the user designates as shown in FIG. 6.

Figure 6:
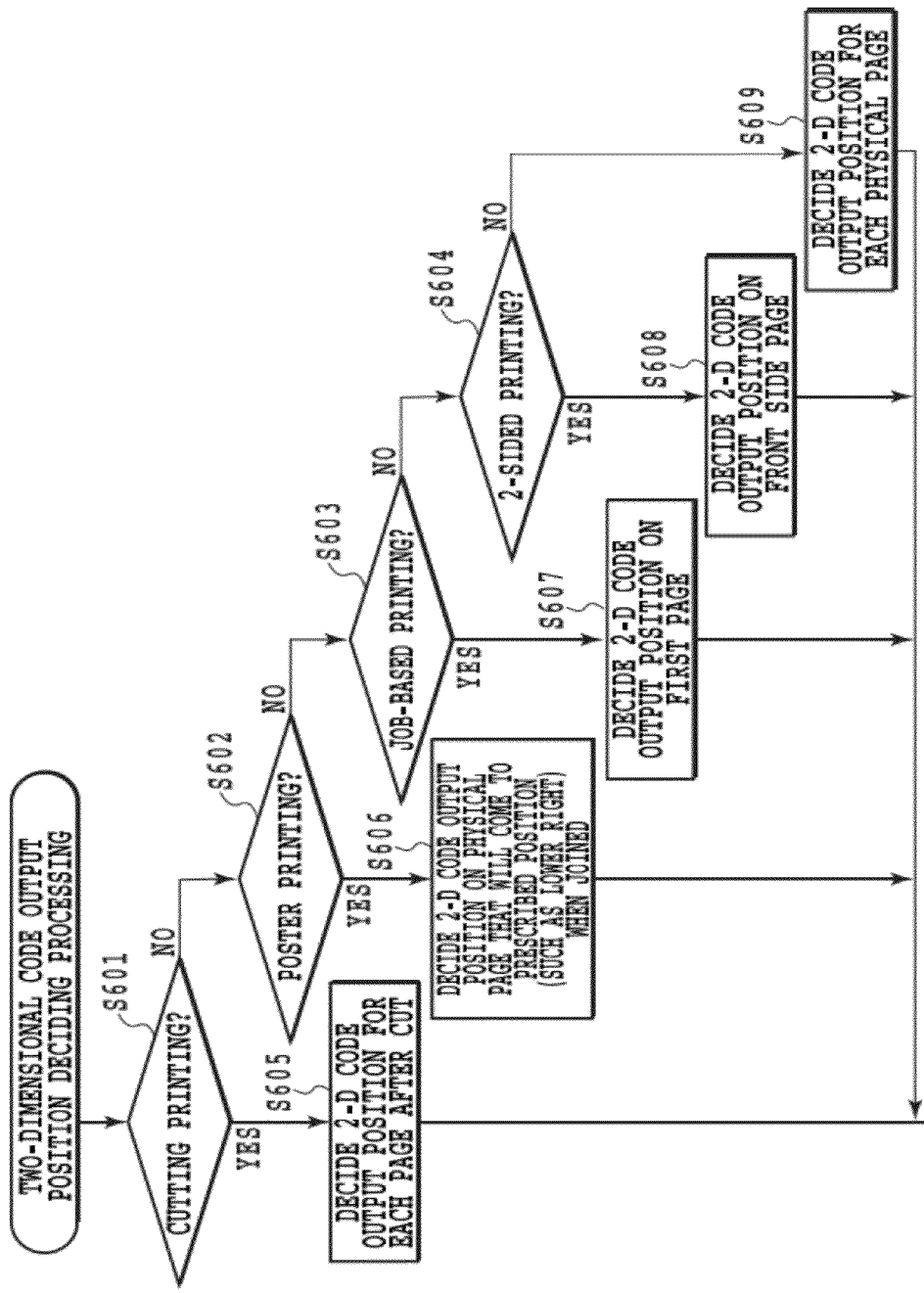
FIG. 6 is a flowchart showing the processing for determining the output position of the two-dimensional code.

At steps S601-S604 in FIG. 6, a decision is made as to the contents of the print setting (page layout setting) the user designates. As the print settings, there are cutting printing, poster printing, job-based printing (such as bookbinding printing or staple printing), 2-sided printing, and other printing (such as normal layout printing (normal printing), and reduction layout (Nup) printing).

In the case of the cutting printing, since the printing is performed on the precondition that the paper is cut thereafter, the position to which the two-dimensional code is output is decided at step S605 for each page (logical page) after cutting.

In the case of the poster printing, since the printing is performed on the precondition that the papers are joined together thereafter, the output position is decided at step S606 in such a manner that the two-dimensional code is printed only at a specified position (at the lower right, for example) on the paper joined together. For example, the output position of the two-dimensional code is decided in the physical page that will come to the lower right when jointed together.

In the case of JOB printing (that is, when it is known that a plurality of pages are dealt with as a set without exception such as in the bookbinding printing and staple printing), the output position of the two-dimensional code having information linked to all the pages is decided at step S607 in such a manner that it is placed only on the first page.

In the case of the 2-sided printing, the two-dimensional code output position is decided at step S608 in such a manner that the information included in the back side is put into the page layout information metadata (which will be described later) indicated by the two-dimensional code on the front side, and that the two-dimensional code is output only onto the front side. As for a sheet whose back side will become blank at the 2-sided printing, information indicating that the back side is blank can be put into the page layout information metadata.

In the other cases (when the printed matter is handled on a physical page basis after the printing), the output position of the two-dimensional code is decided at step S609 for each physical page. For example, in the case of the normal layout printing (when the logical pages are printed on a page-by-page basis), the printing position of the two-dimensional code having the information about the logical page to be printed is decided. In addition, in the case of the reduction layout printing (when a plurality of logical pages are printed on a single physical page), the information about the plurality of logical pages to be printed is stored into a single two-dimensional code, and the printing position of the two-dimensional code is decided on the physical page.

Figure 7:
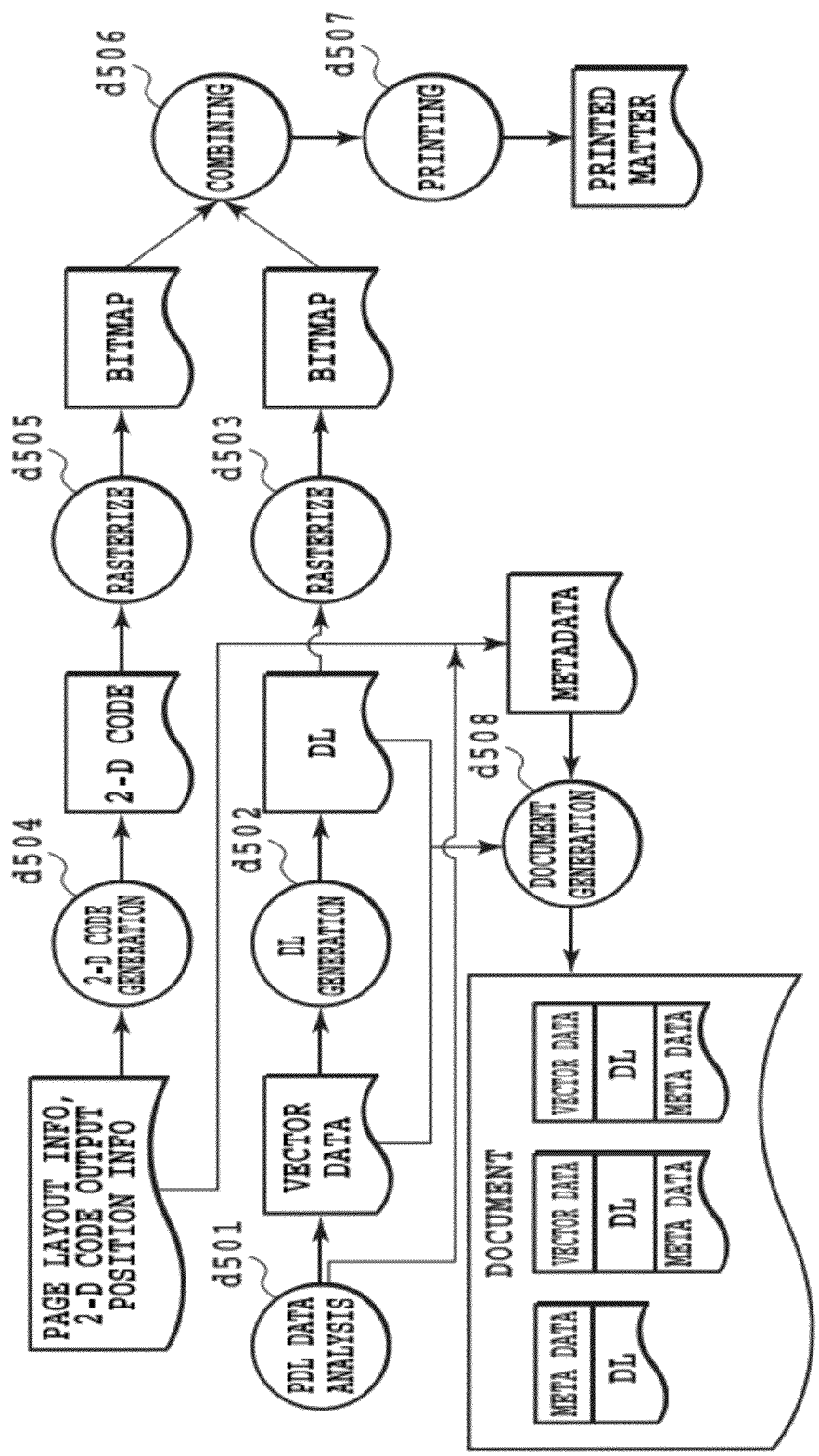
FIG. 7 is a dataflow diagram showing a flow of generating processing of a document composed of vector data, display list and metadata in a PDL print in an embodiment in accordance with the present invention.

FIG. 7 is a dataflow diagram showing a flow of the generating processing/printing processing of the document file.

The controller 200 executes the processing. As described above, in the present embodiment, the MFP receives the PDL data, page layout information and two-dimensional code output position information from the computer.

In PDL data analyzing processing d501, the controller 200 analyzes the PDL data it receives from the computer via the network, and generates the vector data and metadata.

In display list generating processing d502, the controller 200 converts the vector data to the display list.

In rasterizing processing d503, the controller 200 converts the display list to the bitmap data.

In two-dimensional code generating processing (identification code generating processing) d504, the controller 200 generates the two-dimensional code from the page layout information and two-dimensional code output position information received together with the PDL data. The two-dimensional code output position information is decided by the processing of FIG. 6.

In rasterizing processing d505, the controller 200 converts the two-dimensional code generated to the bitmap data.

In combining processing d506, the controller 200 combines the bitmap data obtained at the rasterizing processing d503 and d505.

In printing processing d507, the controller 200 prints the combined bitmap data on paper. Thus, a printed matter having the source document data and two-dimensional code printed is obtained.

In document generating processing d508, the controller 200 generates a document file, and stores it in the document storage 408. The document file records the vector data, display list and metadata generated in the foregoing processing and the page layout information metadata generated from the page layout information and the like while they are associated with each other.

Incidentally, setting the printed matter obtained in the printing processing d606 on the document exposure unit makes it possible to execute the series of the foregoing processing.

Here, the page layout information metadata will be described.

The page layout information metadata, the data indicated by the link information represented by the two-dimensional code, is additional information designating the page layout.

Figure 8:
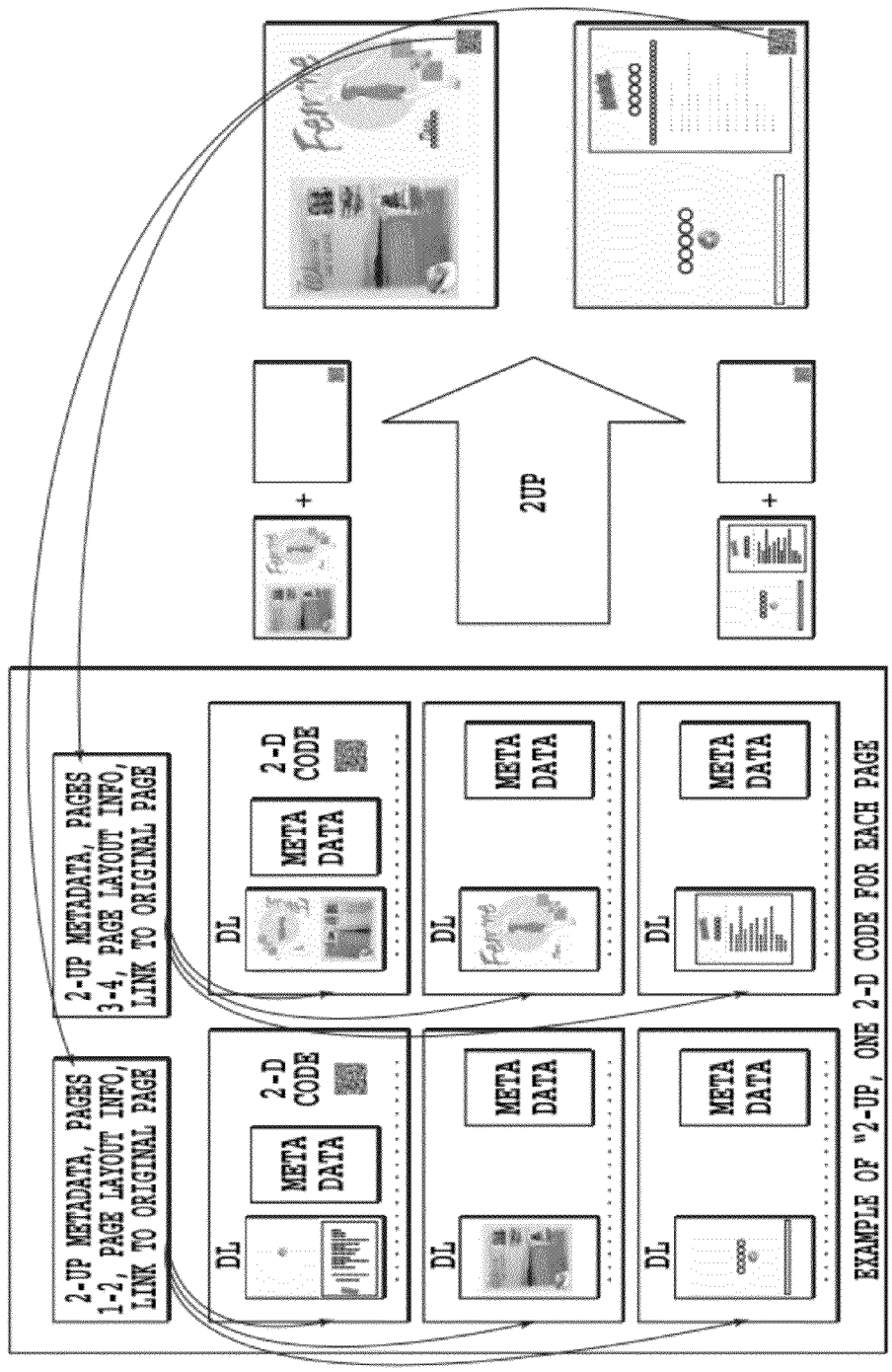
FIG. 8 is a diagram for explaining page layout information metadata in the embodiment in accordance with the present invention.
Figure 9:
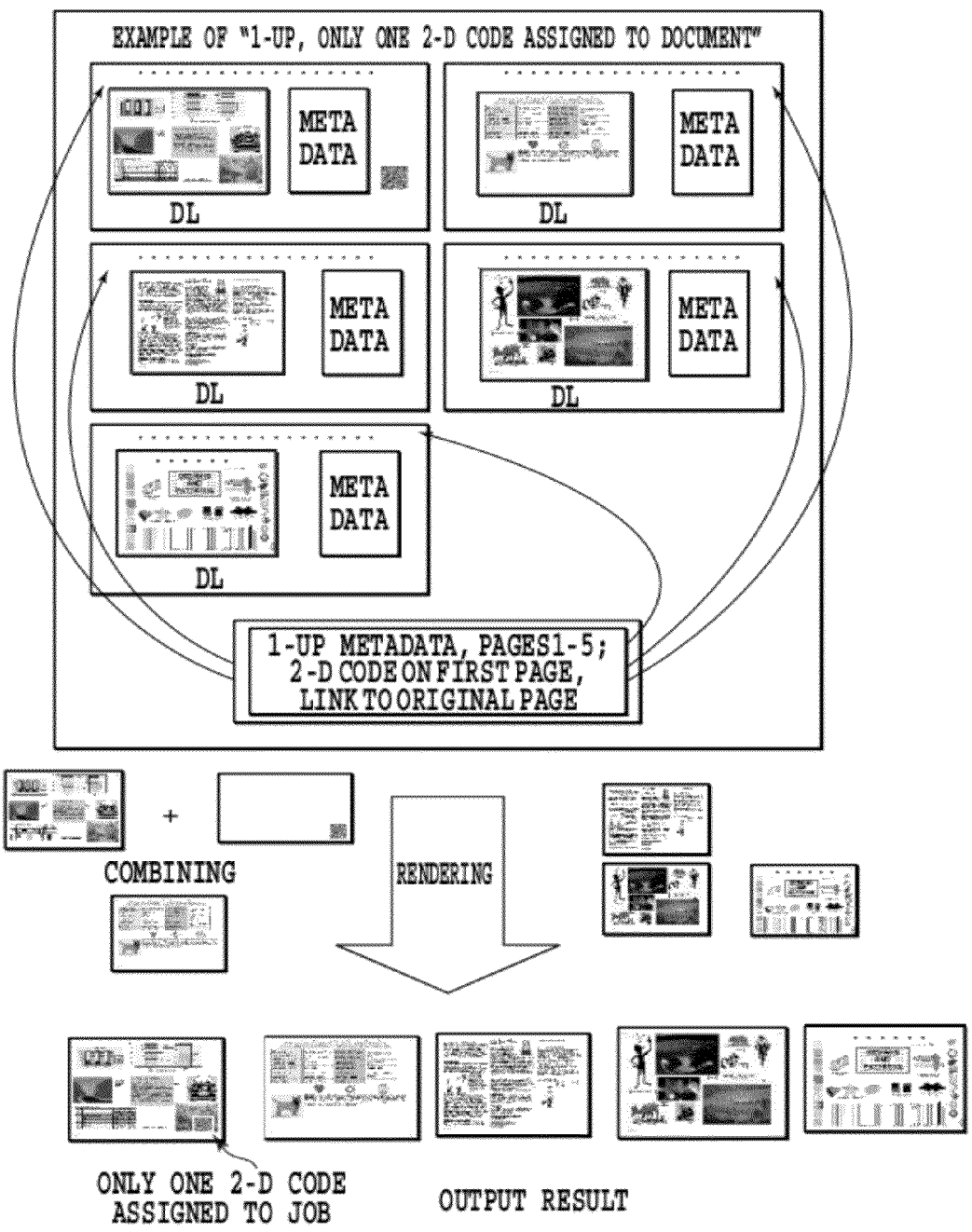
FIG. 9 is a diagram for explaining page layout information metadata in the embodiment in accordance with the present invention.

FIG. 8 and FIG. 9 are diagrams for explaining the page layout information metadata.

As shown in FIG. 8, in the case of printing a single two-dimensional code on each physical page in 2-UP printing (2-in-1 printing, which prints two logical pages on one physical page by reduction), the page layout information metadata describes the following information.

The page layout information metadata about the first physical page describes the page layout information, its display list and the link information designating the document data of each page. The page layout information describes the settings of printing the first logical page on the left side of the first physical page and the second logical page on the right side thereof. Likewise, the page layout information metadata about the second physical page describes the page layout information, its display list and the link information designating the document data of each page. The page layout information describes the settings of printing the third logical page on the left side of the second physical page and the fourth logical page on the right side thereof. As shown in FIG. 9, in the case of printing a single two-dimensional code on a single document consisting of a plurality of physical pages, the page layout information metadata describes link information for designating the page layout information about all the physical pages and for designating the document data.

Figure 10:
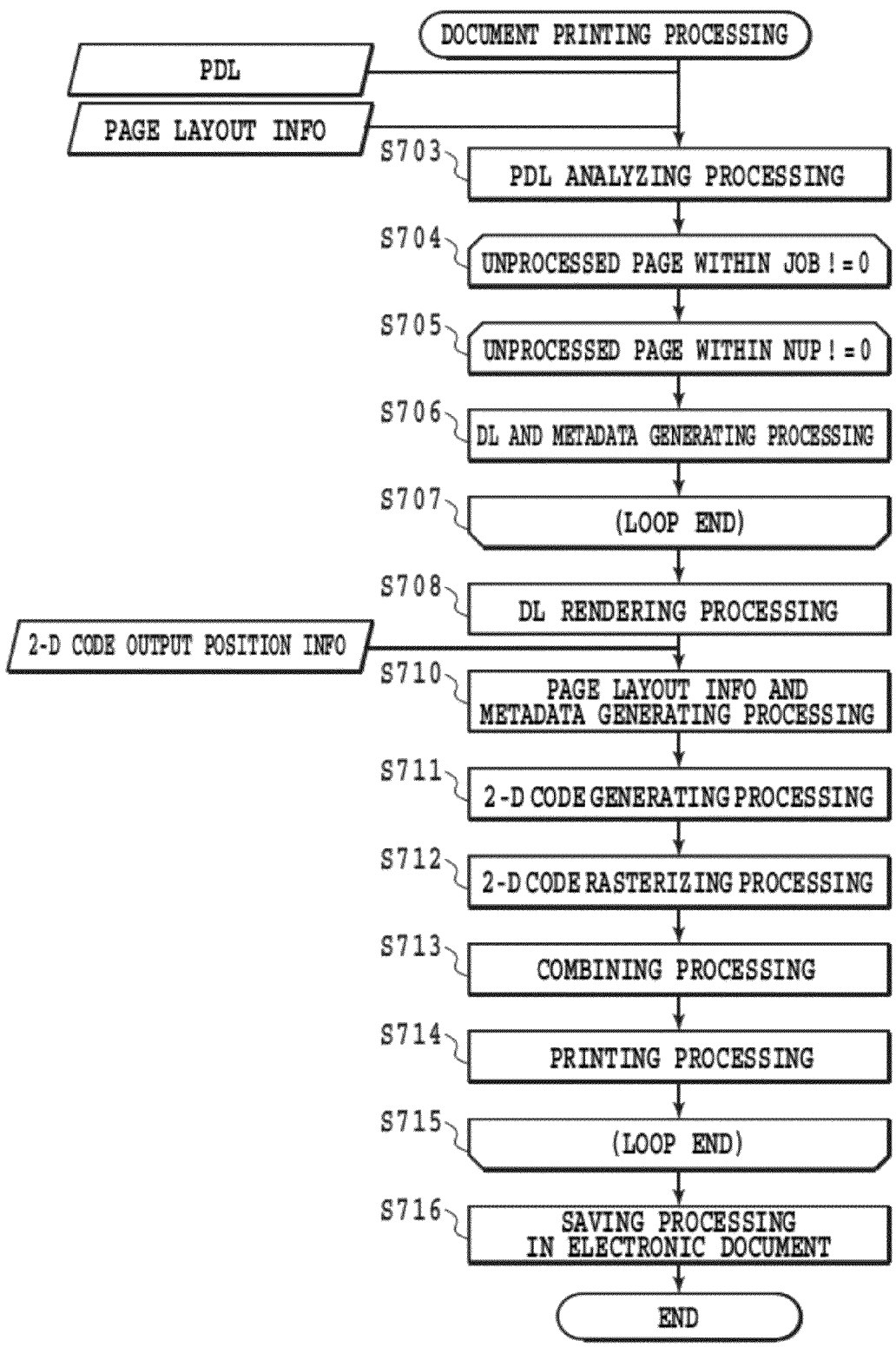
FIG. 10 is a flowchart showing a flow of document printing processing in the embodiment in accordance with the present invention.

FIG. 10 is a flowchart showing a flow of the document printing processing. The controller 200 executes the processing.

At step S703, the controller 200 receives the PDL data and page layout information the printer driver on the computer generates, and executes the PDL data analyzing processing.

Step S704 is a loop origin from which a loop starts until the entire page processing in the received PDL data is completed. Step S705 is a loop origin from which a loop starts until the page layout of all the pages is completed.

At step S706, the controller 200 generates from the vector data in the PDL data the display list and metadata passing through the page layout.

Step S707 is a loop end of the page layout for all the pages (loop end with respect to S705).

At step S708, the controller 200 rasterizes the page layout completed display list generated from step S705 to step S707, and converts the data on the first physical page into the bitmap data.

At step 710, the controller 200 generates the page layout information metadata in accordance with the page layout information and two-dimensional code output position information. Here, the two-dimensional code output position information is that decided in the processing of FIG. 6 described before.

At step 711, the controller 200 generates the two-dimensional code representing the link information indicating the page layout information metadata in accordance with the received two-dimensional code output position information.

At step 712, the controller 200 rasterizes the two-dimensional code generated, and converts it to the bitmap data.

At step S713, the controller 200 combines the bitmap data of the page layout completed display list generated at step S708 with the bitmap data of the two-dimensional code generated at step S712.

At step S714, the controller 200 prints the bitmap data combined, thereby obtaining a printed matter that undergoes the page layout and has the two-dimensional code printed.

Step S715 is a loop end of the processing of all the pages of the PDL data received (loop end with respect to S704).

At step S716, the controller 200 stores the page layout completed display list and metadata (S706) and the page layout information metadata (S710) in the document storage 408 while establishing association between them.

(Copy Processing Using Two-Dimensional Code)

Figure 11:
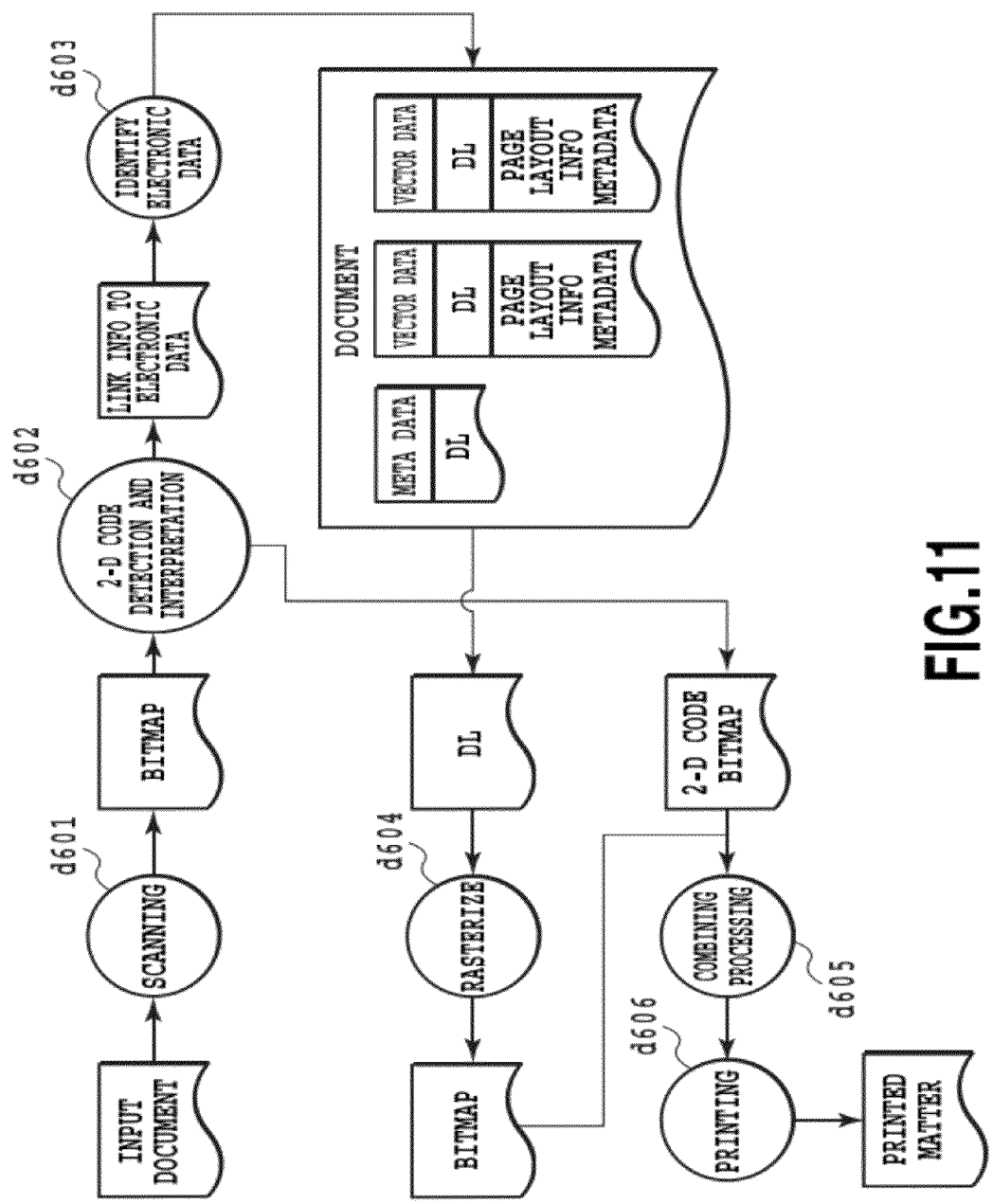
FIG. 11 is a dataflow diagram showing a flow of copy processing in the embodiment in accordance with the present invention.

FIG. 11 is a dataflow diagram showing a flow of the copy processing using the two-dimensional code in the present embodiment.

In scanning processing d601, the controller 200 converts the source document image data (scanned image data) the scanner reads from a paper source document (source document that underwent page layout printing) set on the document exposure unit into the bitmap data. The paper source document has the two-dimensional code printed together with the source document data. Accordingly, the bitmap data includes the bitmap data of the two-dimensional code.

In two-dimensional code detecting/interpreting processing d602, the controller 200 detects and interprets the bitmap data included in the bitmap data of the two-dimensional code. Subsequently, the controller 200 acquires the link information indicating the page layout information metadata stored in the document storage 408 from the two-dimensional code detected. By the processing, the page layout information metadata stored in the document storage 408 is identified (d603).

In rasterizing processing d604, the controller 200 reads the page layout completed display list related to the page layout information metadata in the processing d603 from the document storage 408. Subsequently, it converts the display list to the bitmap data.

In combining processing d605, the controller 200 combines the bitmap data obtained in the rasterizing processing d604 with the bitmap data of the two-dimensional code detected in the two-dimensional code detecting/interpreting processing d602.

In printing processing d606, the controller 200 prints the combined bitmap data on paper. The processing completes copying the paper source document having the source document data (page layout completed source document data) and the two-dimensional code print thereon.

Figure 12:
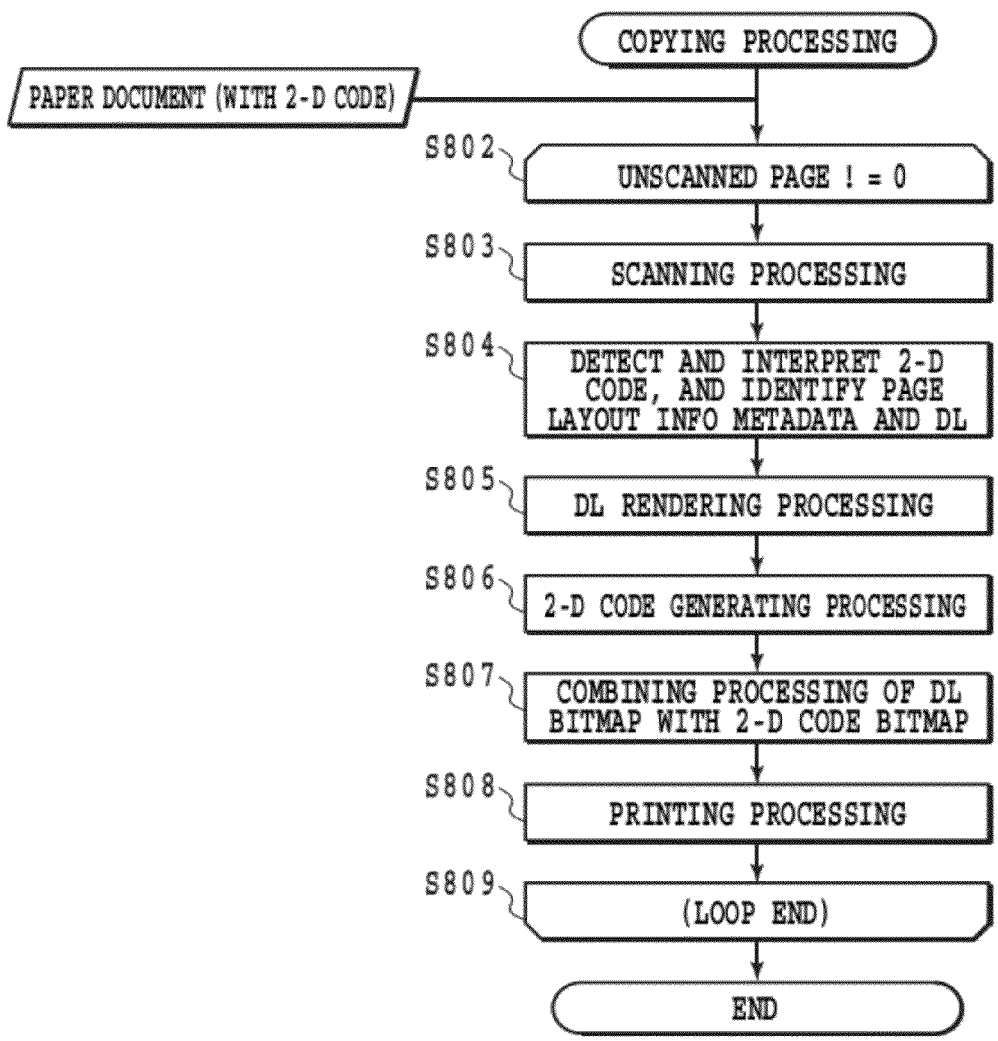
FIG. 12 is a flowchart showing a flow of the copy processing using a two-dimensional code in the embodiment in accordance with the present invention.

FIG. 12 is a flowchart showing a flow of the copy processing using the two-dimensional code.

Step S802 is a loop origin from which a loop starts until the entire page processing of the paper source document is completed.

At step S803, the controller 200 performs the scanning processing on the paper source document (source document that underwent page layout printing) to obtain the source document image data.

At step S804, the controller 200 detects the two-dimensional code included in the source document image data obtained at step S803, and interprets the information the two-dimensional code represents. Subsequently, the controller 200 acquires the link information indicating the page layout information metadata stored in the document storage 408 from the two-dimensional code detected. The processing identifies the page layout information metadata stored in the document storage 408.

At step S805, the controller 200 performs the rasterizing processing on the page layout completed display list related to the page layout information metadata identified at step 804 to convert it to the bitmap data.

At step S806, the controller 200 generates the bitmap data of the two-dimensional code for printing from the data obtained by interpreting the two-dimensional code at step S804.

At step S807, the controller 200 combines the bitmap data of the display list obtained at step S805 with the bitmap data of the two-dimensional code obtained at step S806.

At step S808, the controller 200 prints the combined bitmap data. The processing provides a copied matter of the paper source document on which the source document data (page layout completed source document data) and the two-dimensional code are printed. In this case, since the source document data is not the image acquired by the scanning, but the image rasterized using the original document data stored in the document storage, higher quality printing can be achieved.

Step S809 is a loop end of the processing of all the pages of the input source document, at which the copy processing terminates when the foregoing processing is completed for all the pages.

(Data Structural Example of Document File)

A data structural example of a document file will be described with reference to the drawings.

Figure 13:
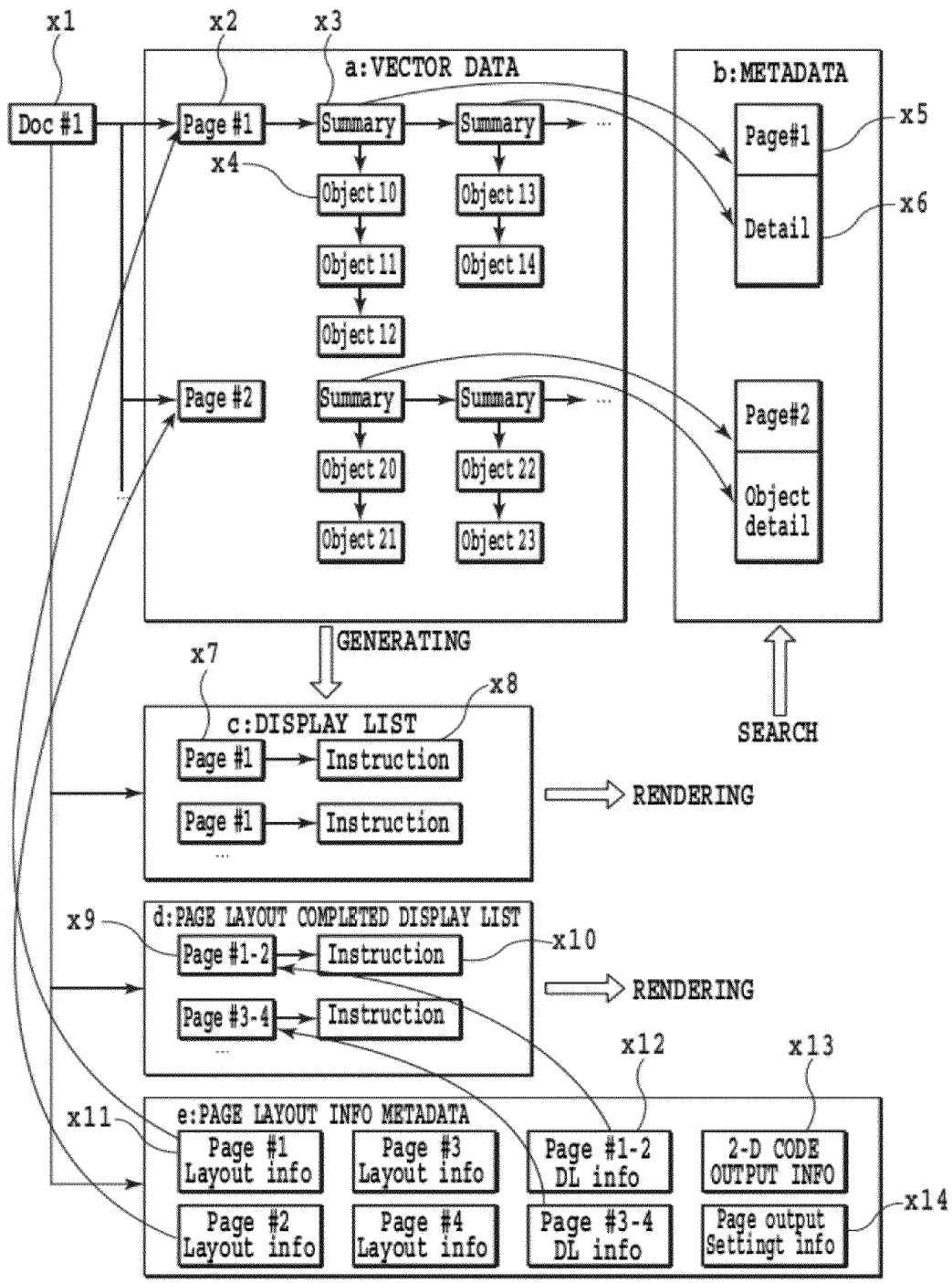
FIG. 13 is a diagram showing a data structure of a document in the embodiment in accordance with the present invention.

FIG. 13 is a diagram showing a data structure of a document file in the present embodiment.

The document file includes data on a plurality of pages, and is expressed in a hierarchical structure having a document header (x1) as a root. The document is composed of vector data (a), metadata (b), display list (c), page layout completed display list (d), and page layout information metadata (e).

The vector data (a) includes page headers (x2), summary information (x3), and objects (x4).

The metadata (b) includes page information (x5) and detailed information (x6).

The display list (c) includes page headers (x7) and rendering developing instructions (x8). The term "instructions (x8)" refers to rendering information depending on the resolution.

Figure 14:
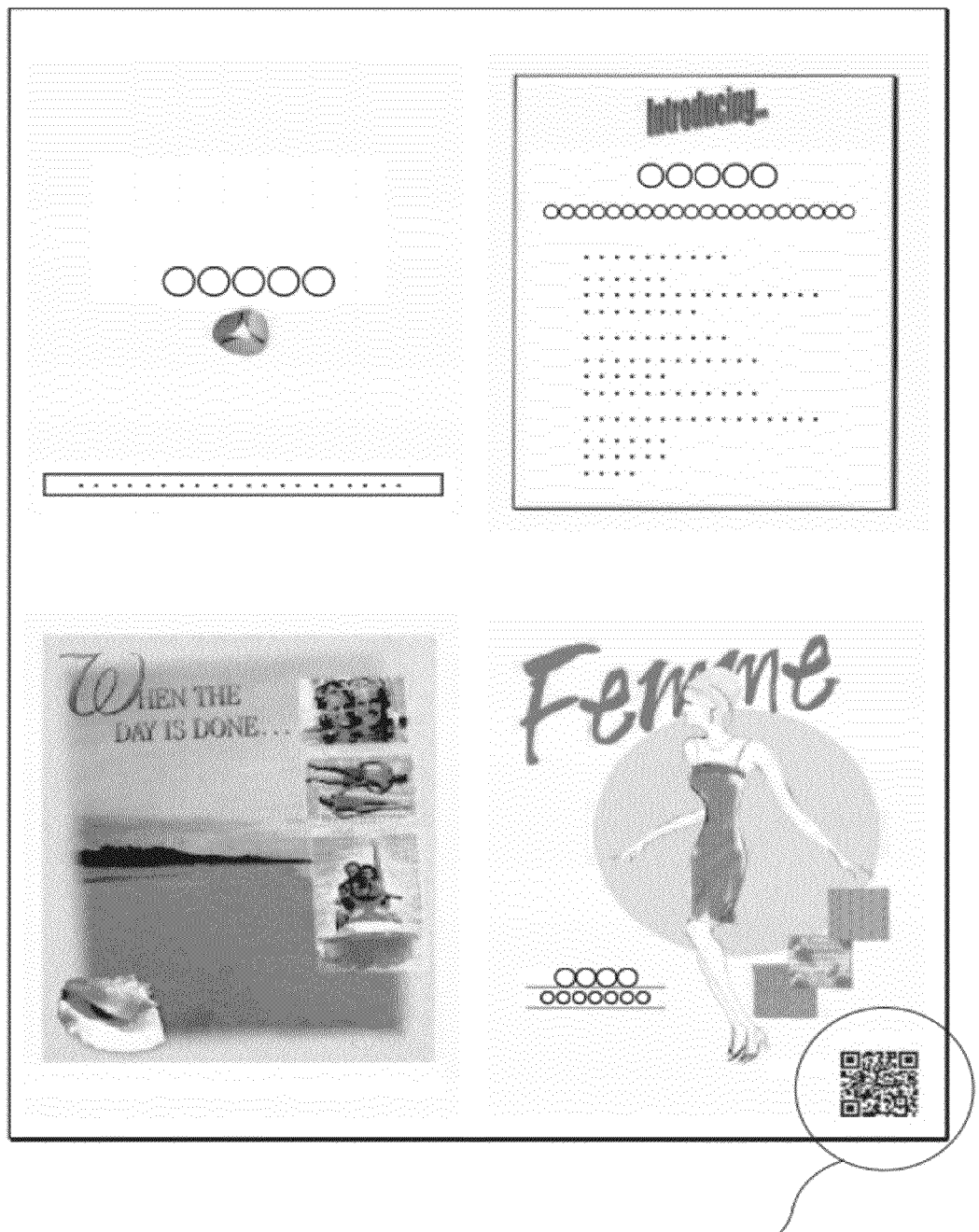
FIG. 14 is a view showing a two-dimensional code output example in the embodiment in accordance with the present invention.

The document header (x1) describes storage areas of the vector data (a), display list (c), page layout completed display list (d), and page layout information metadata (e). In addition, the document header (x1) relates the vector data (a) with the display list (d). The vector data (a) is rendering data independent of the resolution. The page headers (x2) describe page layout information such as the size and direction of the pages. The objects (x4) describe rendering data such as lines, polygons and Bezier curves, and relate them. In addition, the plurality of objects is related to the summary information (x3) collectively. The summary information (x3), which expresses characteristics of the plurality of objects collectively, describes attribute information on divided regions shown in FIG. 14.

The metadata (b) is additional information for retrieval without relating to the rendering processing.

The page information (x5) describes page information indicating as to whether the metadata is generated from the bitmap data or from the PDL data, and the like.

The detailed information (x6) describes character strings (character code strings) generated as OCR information or image information.

Since the summary information (x3) in the vector data (a) is associated with the metadata (b), the summary information (x3) can refer to the detailed information (x6) in the metadata (b).

The display list (c) is an intermediate code for generating the bitmap data.

The page headers (x7) describe a management table of the instructions (x8). The instructions (x8) are composed of the rendering information depending on the resolution.

When a page layout is designated in addition to the display list of a normal single page, the management table (x9) of the page layout completed rendering information is described. The instructions (x10) are composed of the rendering information dependent on the resolution.

The page layout information metadata (e) describes the following information.

Link information to individual pages constituting the page layout completed data, and page layout information (x11).

Link information to the page layout completed display list (x12).

The output position of the two-dimensional code (x13).

Other page output setting information (x14).

Figure 15A:
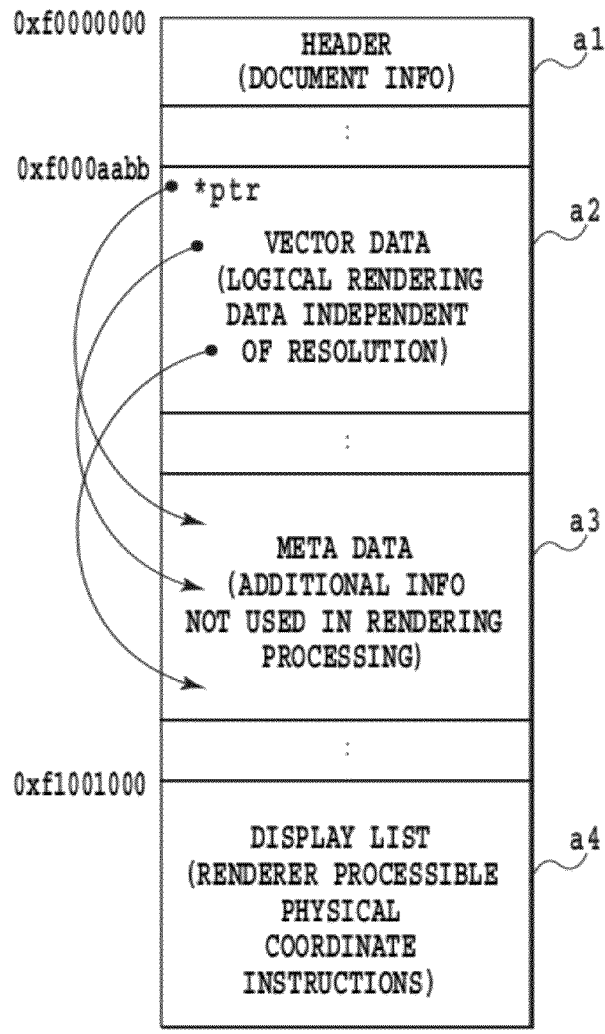
FIG. 15A and FIG. 15B are diagrams each showing a storage area of a storage storing various data shown in FIG. 13 in the embodiment in accordance with the present invention.
Figure 15B:
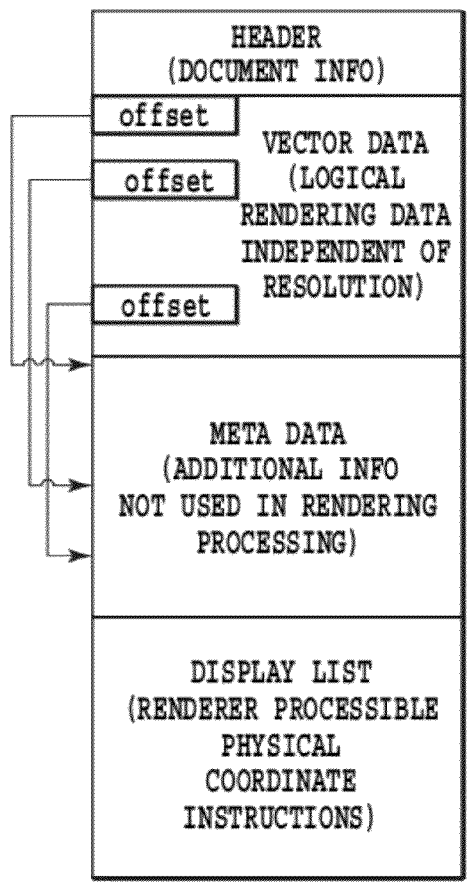

FIG. 15A and FIG. 15B are diagrams each showing a storage area of the storage, which stores various data shown in FIG. 13 in the present embodiment.

FIG. 15A shows a state in which the various data are placed in the memory. The header, vector data, metadata and display list of the document are stored in the header area (a1), vector data area (a2), metadata area (a3) and display list area (a4) in the memory, respectively. The vector data area (a2) stores the vector data. The metadata area (a3) stores the metadata which is additional information not used in the rendering processing. The display list area (a4) stores the display list.

FIG. 15B shows a state in which the various data are placed in the file. The vector data, metadata and display list of the document are placed in the continuous vector data area, metadata area, and display list area.

In the processing of FIG. 10 or FIG. 12, the controller 200 performs on the PDL data the page layout printing having the two-dimensional code attached by designating the page layout information and the two-dimensional code output position information, and makes a copy by reading the resultant printed matter with the scanner. As another embodiment, an example will be described below which carries out printing by designating new page layout information for the resultant printed matter, again. When the new page layout information (print setting) is designated, the processing similar to that of FIG. 6 is executed to determine the new two-dimensional code output position information.

Figure 16:
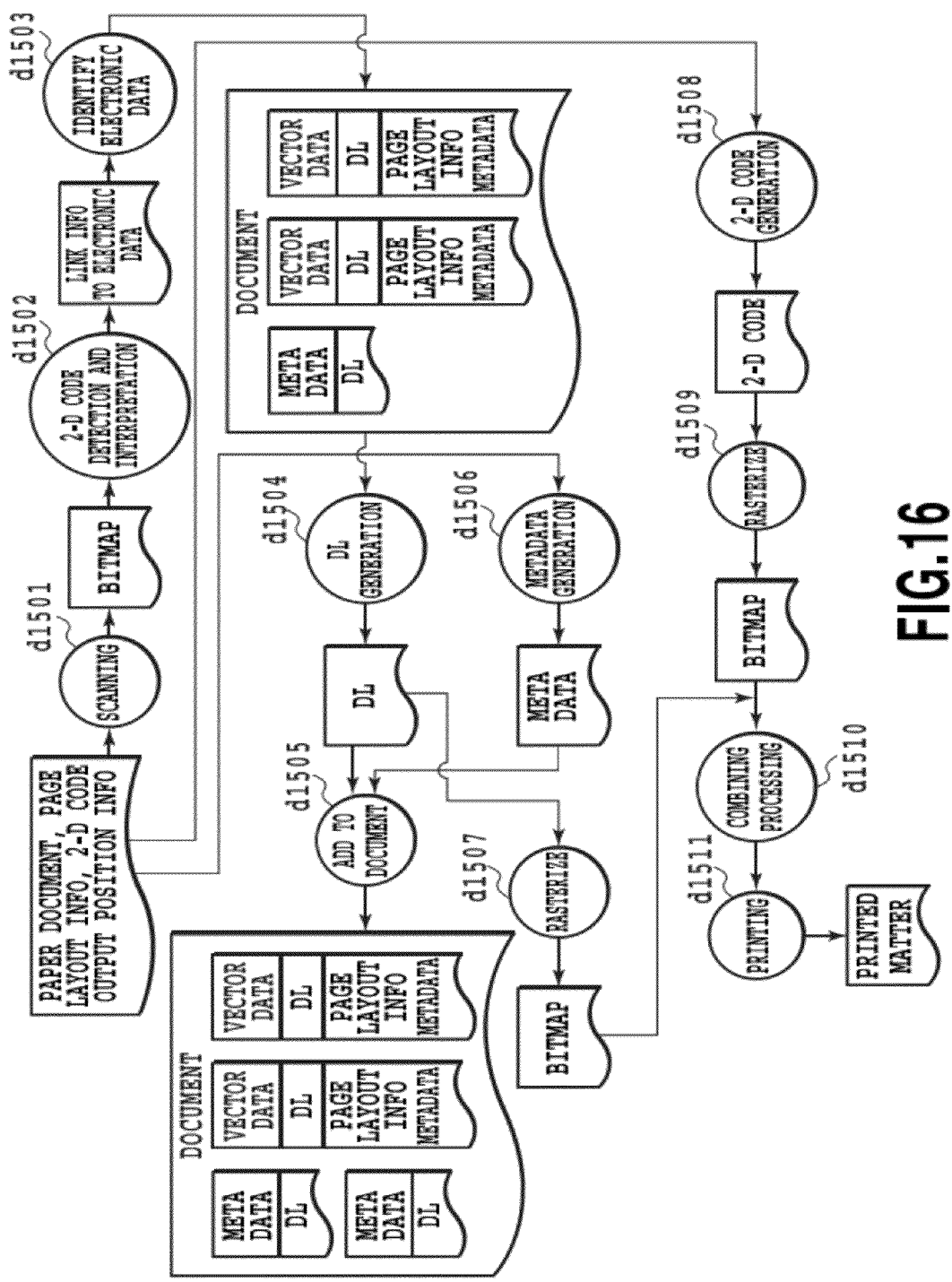
FIG. 16 is a dataflow diagram showing a flow of the copy processing in an embodiment in accordance with the present invention.

FIG. 16 is a dataflow diagram showing a flow when performing copy processing using the two-dimensional code by designating the new page layout information and the new two-dimensional code output position information.

The controller 200 executes the processing. The MFP receives the page layout information and two-dimensional code output position information from the computer.

In scanning processing d1501, the controller 200 converts the source document image data (scanned image data) the scanner reads from a paper source document (source document that underwent page layout printing) set on the document exposure unit into the bitmap data. The paper source document has the two-dimensional code printed together with the source document data. Accordingly, the bitmap data includes the bitmap data of the two-dimensional code.

In two-dimensional code detecting/interpreting processing d1502, the controller 200 detects and interprets the two-dimensional code included in the bitmap data. Subsequently, the controller 200 acquires the link information indicating the page layout information metadata stored in the document storage 408 from the two-dimensional code detected. By the processing, the page layout information metadata stored in the document storage 408 is identified (d1503).

In display list generating processing d1504 and in metadata generating processing d1506, the controller 200 generates the page layout completed display list and the page layout information metadata on the basis of the newly designated page layout information.

In adding processing d1505 to the document, the controller 200 adds the page layout completed display list and the page layout information metadata to the document file.

In rasterizing processing d1507, the controller 200 converts the page layout completed display list to the bitmap. At the same time, in two-dimensional code generating processing d1508, the controller 200 generates the two-dimensional code from the two-dimensional code output position information.

In rasterizing processing d1509, the controller 200 converts the generated two-dimensional code to the bitmap.

In combining processing d1510, the controller 200 combines the bitmap data of the display list rasterized in d1507 with the bitmap data of the two-dimensional code rasterized in d1509.

In printing processing d1511, the controller 200 prints the combined bitmap data on paper. The processing completes copying the paper source document having the source document data (page layout completed source document data) and the two-dimensional code print thereon in the newly designated page layout. Incidentally, setting the printed matter obtained by the printing processing d1511 on the document exposure unit makes it possible to execute the foregoing series of processing again.

Next, the document printing processing based on the two-dimensional code detected by scanning the paper source document will be described with reference to drawings.

Figure 17:
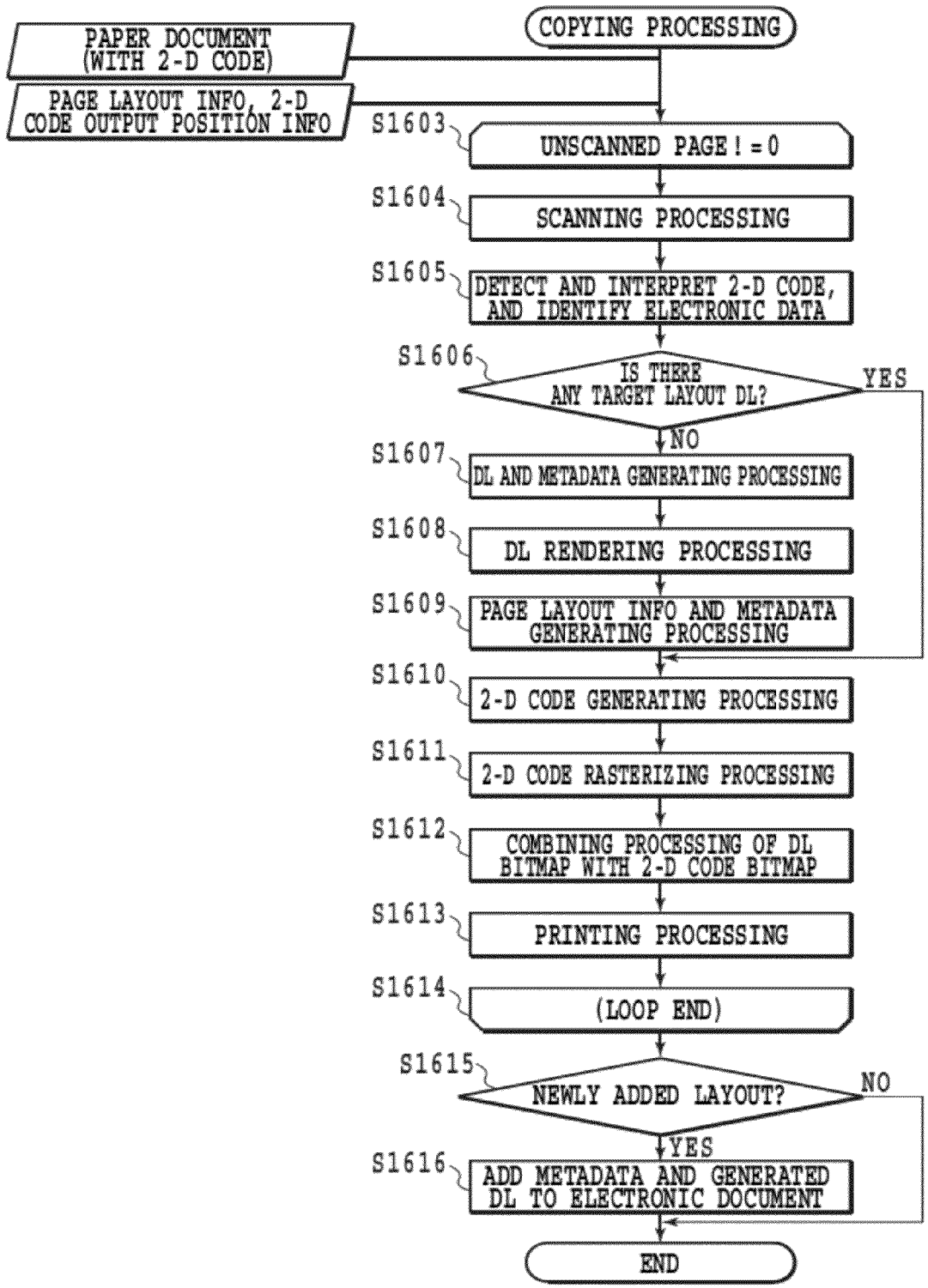
FIG. 17 is a flowchart showing a flow of document printing processing based on a two-dimensional code detected by scanning a paper source document in the embodiment in accordance with the present invention.

FIG. 17 is a flowchart showing a flow of the copy processing using the two-dimensional code. The controller 200 executes the processing. Here, a paper source document is placed on a scanning glass, and the processing is started after the user designates the new page layout information and the two-dimensional code output position.

Step S1603 is a loop origin from which a loop starts until the entire page processing of the paper source document is completed.

At step S1604, the controller 200 performs the scanning processing on the paper source document (source document that underwent page layout printing) to obtain the source document image data.

At step S1605, the controller 200 detects the two-dimensional code included in the source document image data obtained at step S1604, and interprets the information the two-dimensional code represents. Subsequently, the controller 200 acquires from the two-dimensional code detected the link information indicating the page layout information metadata stored in the document storage 408. The processing identifies the page layout information metadata stored in the document storage 408.

At step S1606, the controller 200 makes a decision as to whether a display list associated with the page layout information metadata identified at step 1604 is stored in the document storage 408 or not. When the display list is stored, the controller 200 proceeds to the processing at step S1610. In contrast with this, when the display list is not stored, the controller 200 proceeds to the processing at step S1607.

At step 1607, the controller 200 generates the display list and metadata in accordance with the page layout information.

At step 1608, the controller 200 performs the rasterizing processing on the display list generated to convert the display list to the bitmap data.

At step S1609, the controller 200 generates the page layout information metadata in accordance with the page layout information and the two-dimensional code output position information.

At step S1610, the controller 200 generates the two-dimensional code representing the link information indicating the page layout information metadata generated.

At step S1611, the controller 200 executes the rasterizing processing of the two-dimensional code generated, and converts the two-dimensional code into the bitmap data.

At step S1612, the controller 200 combines the bitmap data of the display list with the bitmap data of the two-dimensional code.

At step S1613, the controller 200 prints the combined bitmap data.

Step S1614 is a loop end of the processing of all the pages of the input source document.

At step S1615, the controller 200 makes a decision as to whether the page layout information undergoing the current processing is newly designated page layout information or not. Unless it is the newly designated page layout information, the controller 200 completes the copy processing. In contrast with this, if it is the newly designated page layout information, the controller 200 proceeds to the processing at step S1616.

At step S1616, the controller 200 stores the display list generated at step S1607 and the page layout information metadata generated at step S1609 in the document storage 408, and completes the copy processing. In this way, when the new page layout information is designated, the page layout information metadata and the page layout completed display list are added to the document file.

(Other Embodiments in Accordance with Present Invention)

The present invention can provide an embodiment of a system, device, method, or computer readable medium. The present invention is applicable not only to a system consisting of a plurality of devises, but also to a single device.

The embodiments in accordance with the present invention include a case that supplies a system or apparatus with a computer program implementing the functions of the present invention described before via a recording medium or network and causes the computer the system or apparatus has to execute the program. The recording medium is a computer readable recording medium. Accordingly, the embodiments can include the computer program itself for implementing the functions of the present invention. The computer program can include object codes, programs executed by an interpreter, script data to be supplied to an OS and the like. The recording medium can be a floppy (registered trademark) disk, hard disk, optical disk, magneto-optical disk, CD-ROM, CD-R, CD-RW, magnetic tape, nonvolatile memory card, ROM, DVD and the like. As a providing method the program, there is one that downloads it from the Internet to a hard disk using a browser of a client computer. This method downloads from the Internet a file of the computer program, or a file that is compressed and has an automatic installing function. In addition, the embodiments can include a case that divides the program code constituting the computer program into a plurality of files, and download the individual files from different servers. Furthermore, the embodiments can include a server that allows a plurality of users to download the files of the computer program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-123559, filed May 9, 2008, which is hereby incorporated by reference herein in its entirety.

What is claimed is:

1. An image processing apparatus comprising:
a position deciding component configured to decide a printing position of an identification code according to a print setting designated for printing target data;
an identification code generating component configured to generate the identification code including link information for designating the printing target data saved in a saving component;
a combining component configured to combine bitmap data for the generated identification code into a printing position in bitmap data generated from the printing target data, wherein the printing position is decided by the position deciding component; and
an output component configured to output the combined bitmap data, wherein when the print setting is set to reduction layout printing performed on the precondition that a plurality of logical pages are printed on a physical page and that the printed matter is handled on a physical page basis, the position deciding component decides on the physical page a printing position of an identification code including link information for designating printing target data corresponding to the plurality of logical pages and the identification code generating component generates the identification code including link information for designating printing target data corresponding to the plurality of logical pages.

2. The apparatus as claimed in claim 1, wherein when the print setting is set to cutting printing performed on the precondition that the printed physical page is cut for use, the position deciding component decides the printing position of the identification code on each cut page and the identification code generating component generates identification codes each corresponding to the cut page.

3. The apparatus as claimed in claim 1 or 2, wherein when it is determined that the print setting is set to poster printing performed on the precondition that a plurality of printed physical pages are joined for use, the position deciding component decides the printing position of the identification code on a physical page coming to a prescribed position when joined and decides not to print the identification code on a physical page joined to a position other than the prescribed position.

4. The apparatus as claimed in claim 1 or 2, wherein when it is determined that the print setting is set to printing performed on the precondition that a plurality of printed physical pages are handled as a set, the position deciding component decides the printing position of the identification code on a first page of the set and decides not to print the identification code on a page other than the first page of the set.

5. The apparatus as claimed in claim 1 or 2, wherein when it is determined that the print setting is set to 2-sided printing, the position deciding component decides the printing position of the identification code on a front side page.

6. The apparatus as claimed in claim 1 or 2, wherein when it is determined that the print setting is set to normal printing, the position deciding component decides the printing position of the identification code for each physical page.

7. The apparatus as claimed in claim 1 or 2, further comprising a saving component configured to save information about the printing target data in association with information on the printing position of the identification code decided by the position deciding component, wherein the identification code includes link information for designating the printing target data saved in the saving component and the information on the printing position of the identification code.

8. The apparatus as claimed in claim 7, further comprising:
a component configured to convert the printing target data into an intermediate page description language; and
a component configured to generate the bitmap data from the intermediate page description language, wherein
the information about the printing target data saved in the saving component includes the intermediate page description language.

9. The apparatus as claimed in claim 1 or 2, wherein the identification code is one of a two-dimensional code, a bar code and a copy-forgery-inhibited pattern.

10. A non-transitory computer readable medium having stored thereon a computer program for causing a computer to function as each component of the apparatus of claim 1 or 2.

11. A method of processing an image using an image processing apparatus having a position deciding component, an identification code generating component, a combining component, and an output component, said method comprising the steps of:
deciding, by the position deciding component, a printing position of an identification code according to a print setting designated for printing target data;

generating, by the identification code generating component, the identification code including link information for designating the printing target data saved in the saving component;

combining, by the combining component, bitmap data for the generated identification code into a printing position in bitmap data generated from the printing target data, wherein the printing position is decided at the deciding step; and outputting the combined bitmap data by the output component, wherein when the print setting is set to reduction layout printing performed on the precondition that a plurality of logical pages are printed on a physical page and that the printed matter is handled on a physical page basis, a printing position of an identification code including link information for designating printing target data corresponding to the plurality of logical pages is decided on the physical page at the deciding step and the identification code including link information for designating printing target data corresponding to the plurality of logical pages is generated at the generating step.

* * * * *